May 3, 1966 V. N. PAWAR 3,249,755
POCKET DOSIMETER USING A PHOSPHOR AND PHOTOCATHODE
Filed Aug. 29, 1962 2 Sheets-Sheet 1
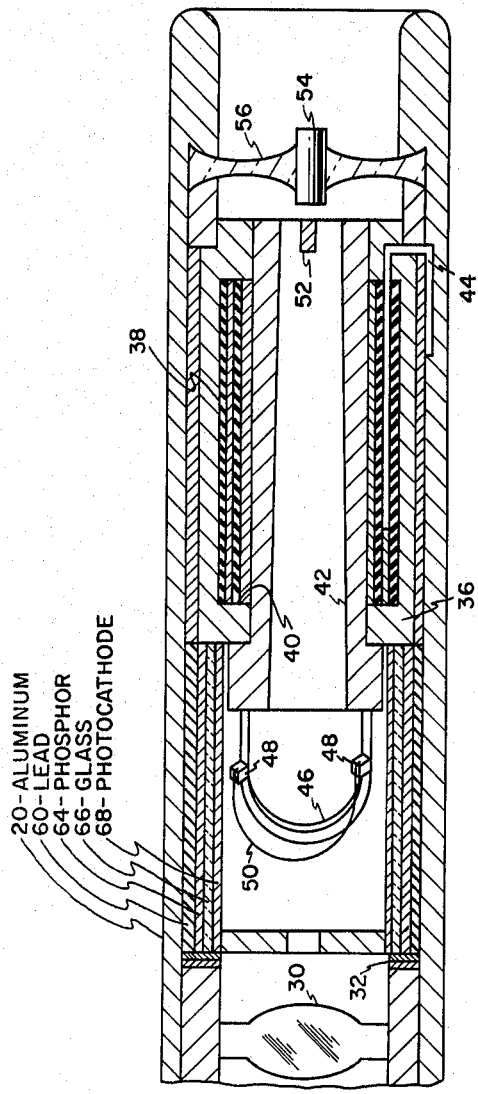
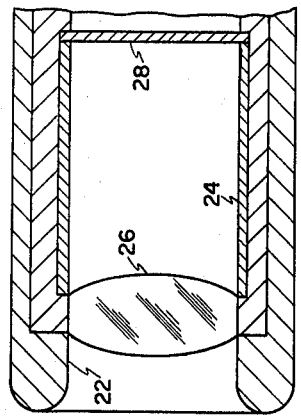
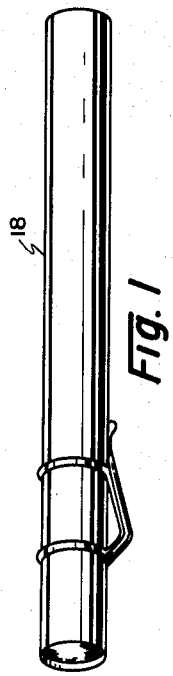
INVENTOR.
VIJAY N. PAWAR
BY
Richard J. Seger
ATTORNEY INVENTOR.
VIJAY N. PAWAR
BY
Richard J. Seeger
ATTORNEY United States Patent Office 3,249,755
Patented May 3, 1966

3,249,755
POCKET DOSIMETER USING A PHOSPHOR
AND PHOTOCATHODE
Vijay N. Pawar, Cincinnati, Ohio, assignor to The Bendix Corporation, Cincinnati, Ohio, a corporation of Delaware
Filed Aug. 29, 1962, Ser. No. 220,302
10 Claims. (Cl. 250—83.3)

This invention pertains to a high efficiency, fast acting, energy and rate independent radiation meter.

In the past, many meters have been devised for measuring radiation rate (ratemeters) and/or accumulated radiation dose (dosimeters). One type of the previous meters uses an ion chamber for changing the radiation into a measurable current by subjecting the molecules in the ion chamber to bombardment by the nuclear radiation resulting in positive ions and electrons. The electrons are then collected by and measured by an electrometer to indicate the radiation.

This invention pertains to improved apparatus for changing the radiation to a measurable current. The apparatus of this invention is in the order of 100 times faster in detecting radiation than the above mentioned ion chamber and in the order of 10,000 times more efficient than the ion chamber. Fast response and high efficiency of this device makes it more sensitive.

In addition, this device is energy independent, or in other words, can count the intensity of radiation incidents regardless of the energy of such incident radiation. In addition, this device is capable of operating over a wide range of rates of radiation intensities without showing saturation effects.

This invention utilizes a phosphor for changing the absorbed radiation energy into photons and then uses a photocathode material for changing the photons into electrons which can be measured in the conventional manner with electrometers. The thickness and properties of the phosphor and photocathode material are matched to provide optimum efficiencies for measuring particular radiation such as gamma rays and X-rays.

This invention is used to detect fast neutrons, by using an hydrogenous radiator for first converting the neutrons into protons which activate the phosphor to give the photon yield which in turn impinges on the photocathode coating to get electrons.

This invention also utilizes a glass coating over the phosphor to do the following: prevent evaporation and preserve the vacuum around the electrometer; to provide a base for the photocathode; and to prevent interaction between the phosphor and the photocathode.

This invention may be used with a radiation ratemeter for measuring the instantaneous rate of radiation or with a dosimeter for measuring the accumulated dose of radiation.

These and other objects will become more apparent when preferred embodiments are considered in connection with the drawings in which:

FIGURE 1 is a view in perspective of a radiation meter utilizing the principles of this invention;

FIGURE 2 is a longitudinal section of the meter of FIGURE 1 which is adapted to detect gamma and X-rays;

The housing, charging unit, and eye piece assembly of this meter will be described briefly and for more detailed description reference is made to U.S. Patent No. 3,110,808, issued November 12, 1963, to D. L. Fauser et al., and entitled "Charged Fibre Radiation Ratemeter."

Figure 5:
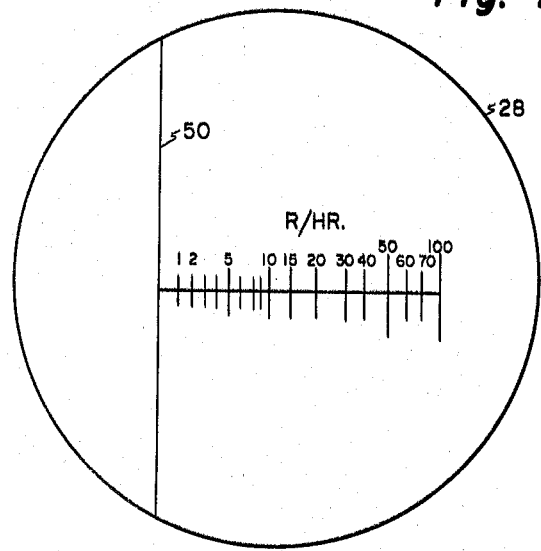
FIGURE 5 is an enlarged view of the radiation meter scale as is seen when viewed through the eye piece assembly; for X-rays or γ-rays the readings are in roentgen per hour and/for neutrons rads per hour.

In the drawings and particularly in FIGURES 1 and 2, is shown the radiation meter having an outer housing 20 formed of a conductive material such as aluminum, magnesium or steel alloy preferably having a thickness of about .1 cm. to increase the absorption of low energy electromagnetic radiation. At the left end of housing 20 is a boss 22 which provides a retaining seat for eye piece assembly 24 which is also tubular in configuration and fits closely inside housing 20. Attached to one end of assembly 24 is eye piece lens 26, which is part of a hermetic seal at the tube end and spaced a distance therefrom is reticle 28, also shown in FIGURE 5, which may have scale markings in roentgens for a dosimeter or roentgens per hour for a ratemeter. At the other end of assembly 24 is attached an objective lens 30.

A condenser 38 formed of alternate layers of insulative and conductive materials is wrapped inside a center recess 40 of an insulator 36, with the innermost layer being conductive and in surface contact with a conductive sleeve 42 which fits centrally in and is supported by insulator 36. Attached to the outermost conductive layer of condenser 38 is a grounding member 44 for making electrical contact with housing 20.

The capacitance of condenser 38 should be as large as possible and can be implemented by means shown in the art and in the above mentioned Fauser et al. application. In addition, other voltage means which are appropriate can be utilized, some of which also are disclosed in the above-mentioned Fauser et al. application.

Inserted in one end of the sleeve 42 is a U-shaped frame 46 formed of a conductive material and having a pair of lugs 48 near each end in which are crimped the ends of a very fine fibre 50 having a quartz or borosilicate glass core. If the instrument shown in the drawings is to be used as a ratemeter, then fibre 50 will be only partially coated with the metallic coating as indicated in the above Fauser et al. application, but if it is to be used as a dosimeter, then it will be completely coated with a metallic coating as indicated in the aforementioned Fauser et al. application.

In the relaxed position, fibre 50 assumes an approximately parallel position to frame 46. In the position shown (FIGURE 5), fibre 50 is in its most extended position due to the fact that a voltage of approximately 150 volts is placed on the frame by condenser 38 through conductive sleeve 42. The high voltage of the same polarity of both the frame and fibre causes mutual repelling force and in the position shown, fibre 50 is at maximum deflection and indicates a reading of zero on the reticle 28. As will be later explained, the radiation will cause the fibre 50 to become discharged so that it will move towards frame 48 by an amount corresponding to the discharge, since there will be a smaller repelling force between the fibre and the frame.

Formed in the right end of sleeve 42 is a transverse conductive bar 52 and aligned with bar 42 is a charging pin 54 which is held in axial alignment by a resilient disc 56. Disc 56 permits longitudinal movement of pin 54, is of transparent, insulative material, and is hermetically sealed at its outer periphery to housing 20. The pressure in the ratemeter or dosimeter is preferably of the order of $10^{-4}$ to $10^{-5}$ mm. Hg.

The purpose of resiliently mounting pin 54 is to permit a convenient charging system for condenser 38. A high potential positive terminal of a direct current charging battery (not shown) is pressed into contact with pin 54 with sufficient force until it makes electrical contact with bar 52 and at the same time the negative terminal of the battery is connected to housing 20 until condenser 30 is sufficiently charged.

Figure 3:
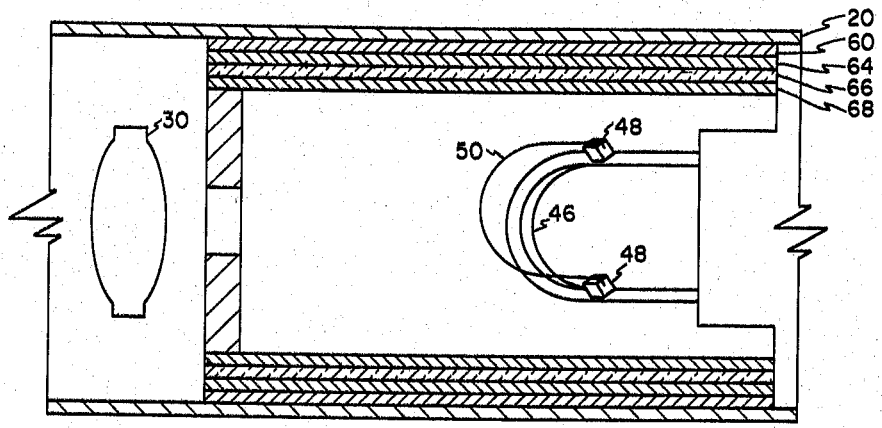
FIGURE 3 is an enlarged sectioned view of the central part of the apparatus of FIGURE 2.

Radiation chamber of embodiment shown in FIGURES 2 and 3

The radiation chamber of FIGURES 2 and 3 has a heavy metal sleeve 60 which may be of a lead or steel material preferably with the thickness of ten millimeters. The purpose of this sleeve is to act as an attenuator and block low energy radiation, for example, that below 100 kilo electron volts, since low energy radiation tends to have large variations in interaction cross sections resulting in large variations in output; in other words the device becomes energy dependent.

The sleeve 60 is lined with a coating of phosphor 64 which is of a composition and thickness adapted for the particular kind of radiation being detected. The purpose of the phosphor 64 is to change the incoming radiation into light quanta. It is known that the efficiency with which this is done depends upon the thickness of the phosphor and its absorption coefficient, which depends upon the composition of the phosphor. Incoming electromagnetic radiation or nuclear particles have a wave characteristic and range depending upon the energy of radiation. The phosphor is selected so that the maximum number of electrons in the phosphor molecules are excited to higher orbits, so that the device will have its maximum efficiency since the light quanta emitted from the phosphor is due to the electrons which have been excited to a higher orbit returning to their normal orbits.

For example, if a phosphor is designed for X-rays or gamma rays, then it would be relatively thicker compared to that designed for particles such as protons in order to provide sufficient distance in which to absorb the energy of the X-rays and gamma rays in order to make measurements.

This relationship is expressed by the formula $$\frac{w_x}{w_0} = e^{-\mu x}$$

where $w_0$ = energy of radiation when it enters the phosphor and has traveled a distance zero
$w_x$ = energy of the radiation after it has traveled a distance X in the phosphor
$e$ = constant (2.7)
$\mu$ = total absorption coefficient of phosphor
$x$ = thickness of phosphor The thickness of the phosphor is so selected that the energy absorbed from the electromagnetic radiation is due to primary interaction (for tissue equivalence). While for neutron dosimetry, the thickness of the phosphor should be of the order of the range of the highest energy protons knocked from the radiator sleeve due to highest energy neutrons. The range of a particle is the distance that the particle will penetrate a given substance before its kinetic energy is reduced to a value below which it can no longer produce ionization. Here, $\mu$, for electromagnetic interactions is not a constant but varies with the energy of the radiation.

The photons emitted from the particular phosphor have a characteristic wavelength; this means that the energies of the photons emitted, regardless of the energy of excitation of the radiation, are equal. Over the bandwidth at which this occurs, the device is energy independent; this means that regardless of the energy of the particles exciting the phosphor, the photon output of the phosphor will be of equal energy so that the device will measure accurately the number of radiation incidents, rather than the total energy of the radiation incidents.

The photocathode material is selected to respond to the characteristic wavelength of the phosphor. Photocathodes are sensitive to a certain degree to all wavelengths but photocathode materials can be selected which are much more sensitive to a certain wavelength of light without showing any appreciable affect to other wavelengths.

The phosphor material selected for use in this invention is preferably highly transparent. This means that the photons can pass through the phosphor easily, so that photons generated near the outer areas of the phosphor can pass through the phosphor towards the photocathode next to be described, without being stopped. This improves the over-all efficiency. For gamma ray and X-ray detection, the phosphor material is preferably NaI(TL) and has a thickness of .15–.2 cm.

Applied to the inner circumference of the phosphor is a glass wall 66 which is important for several reasons. Glass wall 66, prevents evaporation of the phosphor which preserves the vacuum in the radiation chamber around the electrometer elements 46 and 50 so that a minimum of ionization takes place in this area due to ionization of gas in order to give accurate measurements. A second advantage is that the glass wall provides a good base for application of photocathode material 68 and also prevents any chemical interaction between the phosphor and photocathode material.

A photocathode material for receiving the photons from the phosphor and transforming these to electrons, is applied to the glass wall 66. This may be accomplished by vapor depositing, or depositing in any other ways known to the art, a suitable photocathode material, such as potassium hydride, cesium antimony, sodium potassium antimony, or cesium oxygen silver. The choice of the photocathode material will depend on the energy range of light quanta coming from the phosphor material. For example, if the wavelength of the light coming from the phosphor is around 4400 angstrom units, then the cesium antimony or the sodium potassium antimony would provide the more sensitive surfaces. In the infrared region, the cesium oxygen silver would be quite suitable.

The photocathode material 68 is put on the glass coating wall 66 to provide good transparency. By placing photocathode material in this way, the light quanta from the phosphor 64 can strike the inner or exposed surface of the photocathode material. A property of photocathode materials is that if the energizing quanta or photons strike the material from the same side that the emission takes place, the efficiency is higher.

As mentioned, the properties of the photocathode are selected to match the properties of the phosphor for maximum efficiency. If the photocathode has a very low work function, for example 0.8 electron volts, then it will release a large number of electrons when energized by the secondary emission of the phosphor and amplification of $10^4$ to $10^5$ is possible. Also, the photocathode surface is so thin that the energy absorbed from the primary particles or radiation won't have any appreciable effect.

In addition, the energy-wave length curve of the photocathode materials is matched as closely as possible with that of the phosphor materials so that the peaks in one curve are matched by valleys in the other curve to provide energy independence.

The voltage of electrodes 46 and 50 as supplied by the condenser 38 or other charging means is preferably higher than the energy emission from the cathodes so that all of the electrons will be collected. For many applications, a voltage of 100 to 200 volts would be sufficient.

Figure 4:
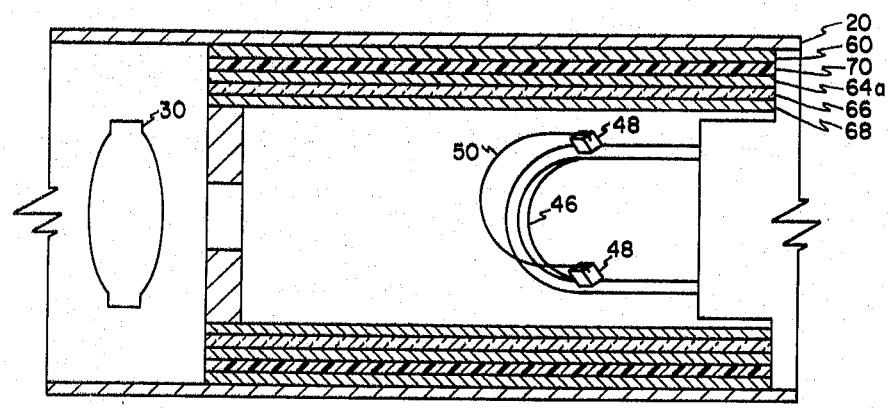
FIGURE 4 is a section view of a central part of an apparatus similar to FIGURE 3 but adapted to detect neutron radiation.

Embodiment of FIGURE 4

The embodiment previously described could be used for the detection of gamma and X-ray radiation, efficiently, but for neutron detection, a material with high interaction cross-section should be used. This is accomplished by providing an intermediate sleeve of hydrogenous material so that the incident neutrons knock off protons which then activate the phosphor.

The embodiment of FIGURE 4, does this by providing next to the outer sleeve 60 a radiator sleeve 70 which may be composed of a polyethylene material or other high density hydrogenous material. Radiator sleeve 70 emits protons when bombarded by neutrons and the protons stimulate the phosphor coating 64a resulting in photon emission. The wall thickness of the radiator sleeve is preferably equal to the range of the most energetic proton produced in neutron-proton scattering due to the highest energy neutrons. The energy of the emitted protons will depend upon the neutron spectrum. The distribution of the protons is isotropic for the neutrons in the energy range of 1–10 mev. This aids in providing an energy independent meter since the same number of protons are emitted per neutron regardless of the energy of the neutron, for the thickness of the radiator as mentioned above.

In this embodiment, a phosphor coating 64a can be formed directly on radiator sleeve 70 or glass sleeve, not shown. For neutron detection, a plastic phosphor with a thickness of .1 cm. having a suitable efficiency for protons is used.

It is also desirable for neutron detection to select a phosphor which is insensitive to gamma and X-rays such as a silver activated zinc sulfide phosphor in combination with the radiator. This is important where the meter is used to measure neutrons which are also in a field of gamma and X-rays. However the plastic phosphors with very small thicknesses will be fairly insensitive to X-ray or gamma ray radiation, when compared to the protons.

The phosphor-photocathode chamber described has very high efficiencies, which are in the order of $10^4$ of that of the ion chambers. Also, the speed of response is about 1 millimicrosecond, which is approximately 100 times faster than ion chamber response making it more accurate and capable of a larger range.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. Apparatus for sensing radiation comprising
phosphor means positioned to receive the incoming radiation and emit photons upon reception of the incoming radiation,
photocathode means positioned to receive the photons and emit electrons upon photon reception,
electron measuring means positioned to receive the electrons and indicate the number of electrons received,
the phosphor and photocathode materials each having a characteristic energy wave length curve,
the total energy emitted for each wave length from said phosphor and photocathode materials being substantially constant within a given bandwidth.

2. Apparatus for sensing radiation comprising
an air tight evacuated cylindrical housing comprising
a cylinder phosphor material being located adjacent to and interiorly of said housing, and positioned to receive the incoming radiation and emit a corresponding number of photons,
a cylinder of photocathode material being located contiguous to and interiorly of said phosphor material, and positioned to receive the photons therefrom and emit a corresponding number of electrons,
electrometer means being inside of said photocathode material and comprising a frame and a flexible fibre connected to said frame,
means to place said frame at a predetermined potential.

3. The apparatus of claim 2 with,
a cylinder of proton producing material for receiving neutrons and emitting protons due to neutron-proton scattering,
said cylinder of proton producing material being between and contiguous with said housing cylinder and said phosphor material cylinder.

4. The apparatus of claim 2 with,
a layer of glass being applied to said phosphor means between said phosphor means and said photocathode means to prevent interaction therebetween, to prevent evaporation of the phosphor means, and to provide a base for said photocathode means.

5. The apparatus of claim 2 with,
a cylinder of attenuating material being exterior to said proton producing cylinder for blocking low energy radiation.

6. The apparatus of claim 2 with,
the thickness of said phosphor coating being determined by the following formula:

$$\frac{w_x}{w_0} = e^{-\mu x}$$

where
$w_0$=energy of radiation when it enters the phosphor and has traveled a distance zero
$w_x$=energy of the radiation after it has traveled a distance X in the phosphor
$e$=constant (2.7)
$\mu$=total absorption coefficient of phosphor
$x$=thickness of phosphor
whereby the total absorption coefficient of the phosphor material is matched to the energy range of the received radiation and the thickness of the phosphor is approximately equal to the range of the radiation particle to be measured.

7. The apparatus of claim 2 with,
the phosphor and photocathode materials each having a characteristic energy-wave length curve,
the total energy emitted for each wave length from said phosphor and photocathode material being substantially constant within a given bandwidth.

8. The apparatus of claim 2 with,
said photocathode material being transparent to increase the efficiency thereof.

9. The apparatus of claim 2 with,
the product of the total absorption coefficient of the photocathode wall and the thickness of the photocathode wall is low for primary particles but high for secondary photons thereby increasing the accuracy of the apparatus.

10. The apparatus of claim 2 with,
said photocathode material having sufficient transparency to the photons from said phosphor material so that the photons can pass from the outer surface of the photocathode cylinder across the cylinder to the inner surface of the cylinder of photocathode material to improve efficiency of emission of electrons from the photocathode material.

References Cited by the Examiner

UNITED STATES PATENTS

| | | | |
|---|---|---|---|
| 2,681,416 | 6/1954 | Thompson | 250—82.1 X |
| 2,900,516 | 8/1959 | Davis et al. | 250—83.1 |
| 2,994,773 | 8/1961 | Sternglass | 250—83.1 |
| 3,052,797 | 9/1962 | Kronenberg | 250—83.3 |
| 3,142,756 | 7/1964 | Goodman et al. | 250—71.5 |

RALPH G. NILSON, *Primary Examiner.*

A. R. BORCHELT, *Assistant Examiner.*